May 6, 1941.                     J. W. ROSS                    2,241,162
                    APPARATUS FOR SHAPING GLASS CHARGES
                 Filed March 23, 1938            2 Sheets-Sheet 1
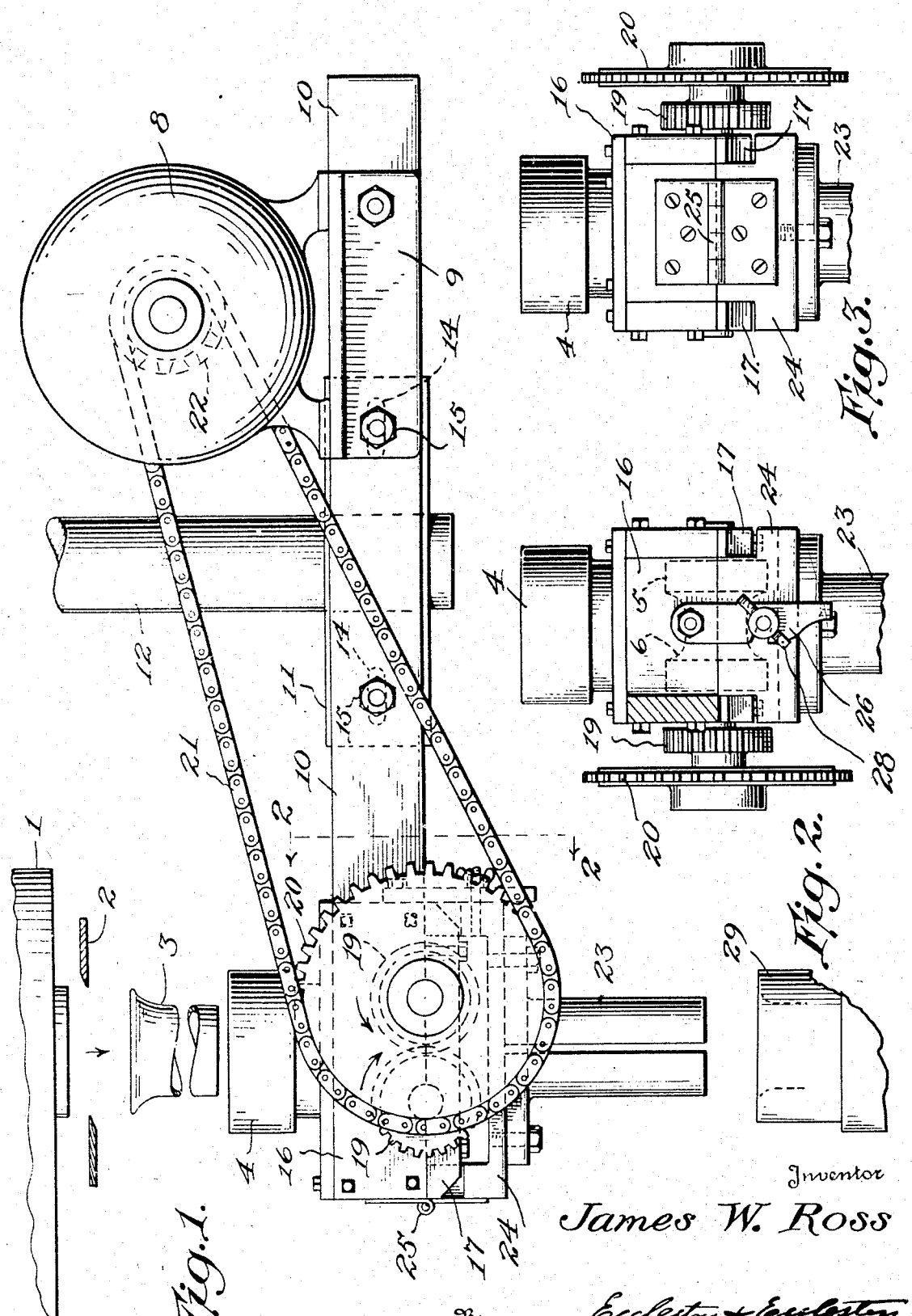
Inventor
James W. Ross
By Eccleston & Eccleston
Attorneys May 6, 1941.  J. W. ROSS  2,241,162
APPARATUS FOR SHAPING GLASS CHARGES
Filed March 23, 1938   2 Sheets-Sheet 2
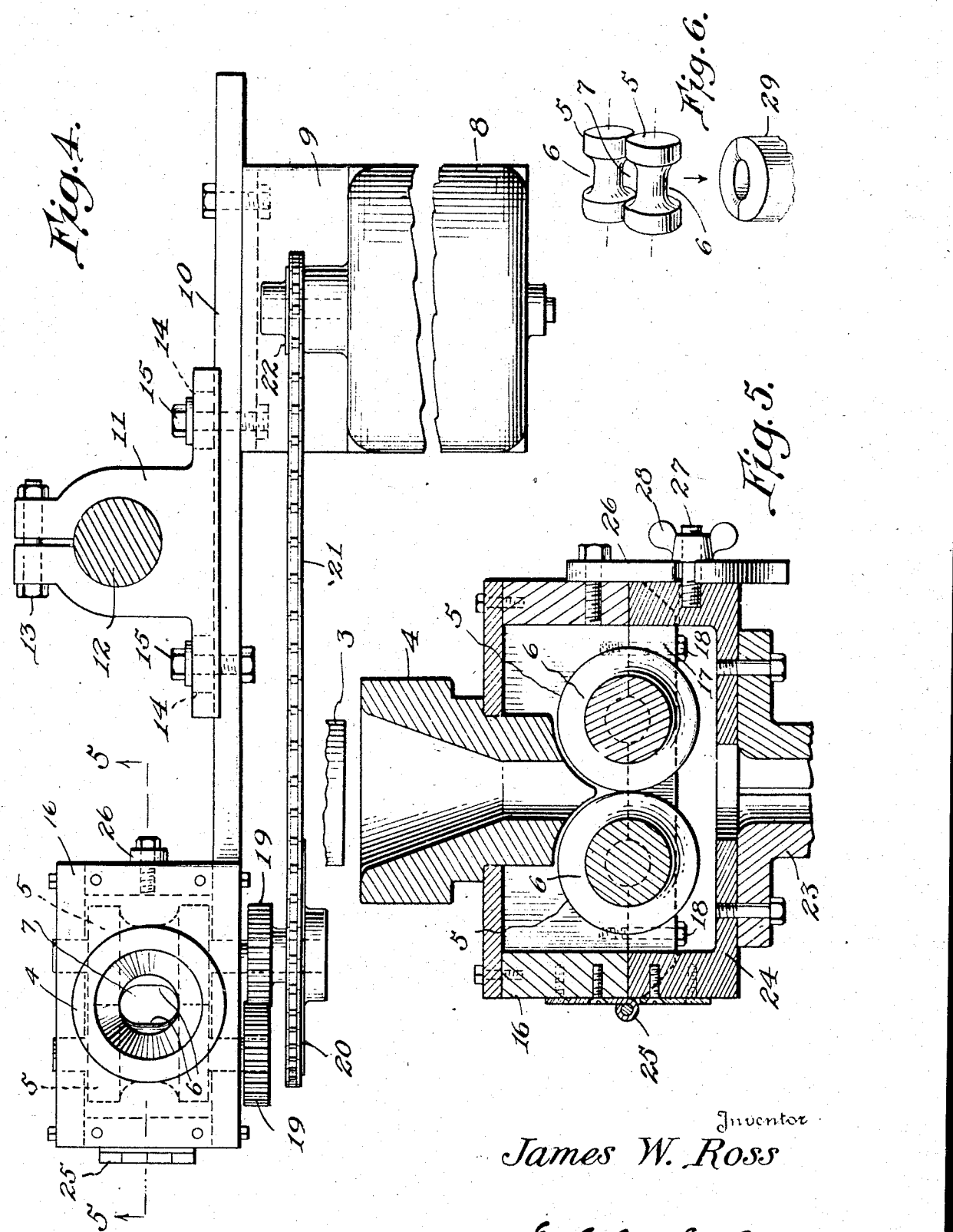
Inventor
James W. Ross
By Eccleston & Eccleston
Attorneys

Patented May 6, 1941

2,241,162

UNITED STATES PATENT OFFICE 2,241,162

APPARATUS FOR SHAPING GLASS CHARGES

James W. Ross, Washington, Pa., assignor to Hazel-Atlas Glass Company, Wheeling, W. Va., a corporation of West Virginia Application March 23, 1938, Serial No. 197,706

4 Claims. (Cl. 49—5)

In the conventional manufacture of glass bottles, the glass charges are substantially round in cross-section, and the parison molds are also round in cross-section. After the parison is formed, it is transferred to a blow mold. If the shape of the bottle is round or substantially round, this method is satisfactory. But in the manufacture of certain types of bottles, such as the panel type, there is frequently a very poor distribution of the glass, due to the necessity of blowing a parison which is round in cross-section, into the final form of a panel bottle.

The above-mentioned difficulty in the manufacture of panel bottles, or any bottle which is relatively wide and slender, is avoided by making the parison molds of a cross-sectional shape similar to the cross-sectional shape of the finished bottle, and making the glass charges of substantially the cross-sectional shape of the parison mold.

The Thomas Stenhouse Patent No. 2,020,623, granted November 12, 1935, discloses a method and apparatus by which glass charges, while dropping from the feeder to the parison mold, are changed from a substantially round cross-sectional shape to substantially the same cross-sectional shape as that of the parison mold. The present invention relates to an improvement in the apparatus disclosed in the above-mentioned Stenhouse patent.

The invention will be clearly understood, to those skilled in the art, from the following description, when taken in connection with the accompanying drawings, in which:

Figure 1 is a side elevational view of the apparatus.

Figure 2 is a sectional view taken on line 2—2 of Figure 1.

Figure 3 is an end view of the apparatus; parts being broken away.

Figure 4 is a plan view of the apparatus.

Figure 5 is a vertical sectional view, taken on line 5—5 of Figure 4; and

Figure 6 is a diagrammatic representation of the shaping rollers and mold.

Referring to the drawings in more detail, numeral 1 indicates an ordinary flow spout, provided with any desired type of feeder (not shown), and shears 2 arranged below the flow orifice, for severing the formed charges.

Of course the shaping apparatus may be positioned at any distance below the feeder, either relatively close thereto, or at a great distance therefrom, and if desired, a pipe 3 may lead from a point just below the feeder to a point just above the shaping apparatus.

The pipe 3 is in vertical alignment with a guide member 4, which receives the glass charges and leads them to a position between a pair of shaping rollers 5, 5.

These shaping rollers constitute an essential feature of the present invention. As clearly shown in the drawings, these rollers are in contact with each other, and centrally each roller is circumferentially cut-away or grooved as indicated by numeral 6, so that an opening or passage 7, is provided between the rollers. By varying the cross-sectional shape of the circumferential groove in the rollers, the opening or passage 7 is made of any desired cross-sectional shape.

By reference to Figures 1 and 6, it will be noted that the cross-sectional shape of passage 7, is substantially oval, and that the cross-sectional shape of the parison mold cavity is also substantially oval. Thus the mold charge conforms substantially to the shape of the parison mold, and the formed parison will, in a general way, approach the shape of the blow mold and formed article. It is therefore apparent that when the parison is blown in the blow mold, there will be an even distribution of the glass, as distinguished from the uneven distribution which often occurs when a panel bottle or the like is blown from a parison which is substantially round in cross-section.

I have discovered that the shaping action of the rollers is rendered more efficient, if these shaping elements are positively rotated. Obviously any desired means may be employed for this purpose, but in the embodiment illustrated the rollers are continually rotated, in the direction indicated by arrows in Figure 1, by means of a motor 8. This motor is mounted on a bracket 9 attached to a bar 10. The bar is bolted to a bracket 11 which is clamped to a post 12 by means of a bolt 13. Thus the bar may be vertically adjusted on the post, and may be circumferentially adjusted about the post, and the bar is itself longitudinally adjustable on the bracket 11, by means of slots 14 and bolts 15.

The bar 10 carries the roller casing 16, and by means of the adjustments mentioned above, the rollers can be accurately positioned with respect to the flow orifice from which the charges are delivered.

In the specific form illustrated the roller shafts are mounted in suitable bearings provided in the lower edges of the casing side walls, and the upper edges of members 17. These members 17 are removably attached to the lower edge of the casing side walls, by means of bolts 18. Thus to remove the shaping rollers 5, for the purpose of repairs or substituting rollers of different sizes or shapes, it is only necessary to remove the bolts 18.

The roller shafts are provided with meshing gears 19, and one of the shafts is also provided with a sprocket wheel 20. A sprocket chain 21 constitutes a driving connection between sprocket wheel 20 and a sprocket wheel 22 carried by the shaft of the motor 8. By means of this construction, the shaping rollers are continually driven in the directions indicated by the arrows in Figure 1. It may be mentioned that the rollers are driven at a very high speed, usually somewhere in the neighborhood of 600 R. P. M., but of course the particular speed is determined by various factors, and the invention is obviously not limited to any particular speed. Likewise, it is not essential that the shaping rollers be continuously rotated in the direction indicated. They may be intermittently rotated in the direction indicated, or they may be rotated first in one direction and then in the opposite direction; it being only necessary that they are rotated in the direction indicated while performing the operation of shaping a charge.

While it is not an essential part of the invention, yet it is usually desirable to employ a guide from the shaping rollers to a point just above the molds, to protect the workmen and also to protect the glass charges from air currents.

In the specific embodiment illustrated, the guide is formed by two sections 23, which are arranged in close, cooperative relation, and attached to a bracket member 24. Of course the passage formed by the sections 23, may be of any desired cross-sectional shape.

The bracket member 24 has one end pivotally attached to an end wall of the roller casing 16, by means of a hinge 25. And the bracket is held in its normal position by means of a latch 26 pivotally mounted on the casing and adapted to engage a pin 27 on the bracket member. The parts are locked in this position by means of a wing nut 28 threaded on the pin. Should it become necessary to quickly reach the shaping rollers, to dislodge a piece of glass, or for other reasons, it is only necessary to release the latch and swing the bracket member and guide clear.

Numeral 29 refers to a parison mold beneath the lower end of the guide member. The molds are, of course, ordinarily mounted on rotatable tables.

The operation will be apparent from the foregoing description of the apparatus. The glass charges, delivered by any desired type of feeder, are substantially round in cross-section, and when severed drop to the shaping rollers. These rollers are preferably in contact, and the circumferential cut-away portions or grooves cooperate to form a passage of the desired cross-sectional shape, substantially oval in the form illustrated.

The shaping rollers, at the time of receiving a glass charge, are positively rotated at high speed in the directions indicated by the arrows. The glass charge thus passes rapidly through the passage 7 and is instantly changed from the original round cross-sectional shape to the cross-sectional shape of the passage, which in this instance is substantially oval.

The oval-shaped charge passes directly from the shaping rollers to the oval-shaped mold cavity of the parison mold 29. Thus the glass parison is shaped to the general shape of panel bottles, such as perfume bottles, and any bottles which are relatively wide and slender. By thus shaping the glass parison to the general shape of the blow mold, there is an even distribution of glass during the blowing operation, as distinguished from the uneven distribution of glass which usually occurs when panel bottles are blown from parisons round in cross-section.

Having fully described the invention, what I claim is:

1. An apparatus for changing the cross-sectional shape of glass charges to substantially the cross-sectional shape of the parison mold, including a parison mold having a mold cavity non-circular in cross-section, a pair of contacting shaping rollers, each roller having a circumferential cut-away portion uniform throughout the circumference of the roller, the cut-away portions of the two rollers cooperating to form a passage of substantially the non-circular cross-sectional shape of the mold, and a glass feeder from which the charges drop to the shaping rollers.

2. An apparatus for changing the cross-sectional shape of glass charges to substantially the cross-sectional shape of the parison mold, including a pair of contacting shaping rollers, each roller having a circumferential groove uniform throughout the circumference of the roller, the grooves of the two rollers cooperating to form a shaping passage substantially oval in cross-section, a glass feeder from which the charges drop to the shaping rollers, and a mold having a cavity substantially oval in cross-section, to receive the shaped charges.

3. An apparatus for changing the cross-sectional shape of glass charges to substantially the cross-sectional shape of the parison mold, including a parison mold having a mold cavity non-circular in cross-section, a pair of contacting shaping rollers, each roller having a circumferential cut-away portion uniform throughout the circumference of the roller, the cut-away portions of the two rollers cooperating to form a passage of substantially the cross-sectional shape of the mold, a glass feeder from which the charges drop to the shaping rollers, and means for positively rotating the rollers, at high speed, in the direction of travel of the charges.

4. An apparatus for changing the cross-sectional shape of glass charges to substantially the cross-sectional shape of the parison mold, including a parison mold having a mold cavity substantially oval in cross-section, a pair of contacting shaping rollers, each roller having a circumferential groove uniform throughout the circumference of the roller, the grooves of the two rollers cooperating to form a shaping passage substantially oval in cross-section, a glass feeder from which the charges drop to the shaping rollers, and means for continuously rotating the rollers in the direction of travel of the charges.

JAMES W. ROSS.